(12) United States Patent
Hyun

(10) Patent No.: US 9,929,626 B2
(45) Date of Patent: Mar. 27, 2018

(54) COOLING-MEMBER-INTEGRATED MOTOR

(71) Applicant: LG INNOTEK CO., LTD., Seoul (KR)

(72) Inventor: Woo Jin Hyun, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 678 days.

(21) Appl. No.: 14/105,605

(22) Filed: Dec. 13, 2013

(65) Prior Publication Data

US 2014/0167536 A1    Jun. 19, 2014

(30) Foreign Application Priority Data

Dec. 17, 2012 (KR) .................... 10-2012-0147373

(51) Int. Cl.
  *H02K 9/19*  (2006.01)
  *H02K 9/193*  (2006.01)
  *H02K 5/20*  (2006.01)

(52) U.S. Cl.
  CPC ............. *H02K 9/19* (2013.01); *H02K 5/20* (2013.01); *H02K 9/193* (2013.01)

(58) Field of Classification Search
  CPC .. H02K 5/08; H02K 5/20; H02K 9/10; H02K 9/16; H02K 9/18; H02K 9/22; H02K 9/19; H02K 9/193
  USPC ................. 310/52, 54, 57, 58, 59, 64, 65
  See application file for complete search history.

(56) References Cited

U.S. PATENT DOCUMENTS

| | | | | |
|---|---|---|---|---|
| 5,859,482 | A * | 1/1999 | Crowell | H02K 5/20 310/54 |
| 6,633,097 | B2 * | 10/2003 | Dunlap | H02K 5/20 310/54 |
| 7,737,585 | B2 * | 6/2010 | Bahr | H02K 5/20 310/52 |
| 7,745,965 | B2 * | 6/2010 | Oestreich | H02K 5/20 310/52 |
| 8,516,850 | B2 * | 8/2013 | Jadric | F25B 31/008 62/505 |
| 2008/0278011 | A1 * | 11/2008 | Elgas | H02K 5/20 310/52 |
| 2011/0234028 | A1 * | 9/2011 | Iwasaki | H02K 9/22 310/52 |

(Continued)

FOREIGN PATENT DOCUMENTS

| | | |
|---|---|---|
| CN | 101317314 | 12/2008 |
| CN | 101436804 | 5/2009 |

(Continued)

OTHER PUBLICATIONS

Werner Hollstein, Jul. 17, 2012, Hunstaman Advanced Materials pp. 1-2.*

(Continued)

*Primary Examiner* — John K Kim
*Assistant Examiner* — Minki Chang
(74) *Attorney, Agent, or Firm* — KED & Associates, LLP

(57) ABSTRACT

A cooling-member-integrated motor includes a housing and a stator including a stator core and a stator coil wound around the stator core. A cooling member surrounds an outer circumferential surface of the stator, and a molding member is disposed in the housing. The stator and the cooling member are integrally embedded in the molding member.

6 Claims, 4 Drawing Sheets

(56) References Cited

U.S. PATENT DOCUMENTS

| | | | |
|---|---|---|---|
| 2011/0248507 A1* | 10/2011 | Petersen | H02K 1/20 290/55 |
| 2011/0278971 A1 | 11/2011 | Matsumoto | |
| 2012/0001503 A1* | 1/2012 | Owng | H02K 9/14 310/54 |
| 2012/0186797 A1 | 7/2012 | Lee | |
| 2012/0216995 A1 | 8/2012 | Lee | |
| 2013/0106210 A1* | 5/2013 | Tsutsui | H02K 5/128 310/52 |
| 2014/0319936 A1* | 10/2014 | Makino | H02K 5/20 310/43 |

FOREIGN PATENT DOCUMENTS

| | | |
|---|---|---|
| CN | 102801226 | 11/2012 |
| CN | 103095049 | 5/2013 |
| DE | 20 2011 004 465 | 6/2011 |
| EP | 0 859 447 | 8/1998 |
| EP | 0 980 132 | 2/2000 |
| EP | 2 067 960 | 6/2009 |
| JP | H 08-322170 | 12/1996 |
| SE | 519 097 | 1/2003 |

OTHER PUBLICATIONS

Chinese Office Action (with Full English translation) dated Feb. 6, 2017 issued in Application No. 201310693352.5.
European Search Report (Full English Text) dated Aug. 28, 2017 issued in Application No. 13197276.2.

* cited by examiner

COOLING-MEMBER-INTEGRATED MOTOR

CROSS-REFERENCE TO RELATED APPLICATION

This application claims priority to and the benefit of Korean Patent Application No. 10-2012-0147373, filed on Dec. 17, 2012, the disclosure of which is incorporated herein by reference in its entirety.

BACKGROUND

1. Field

The present application relates to a cooling-member-integrated motor, in particular, to a cooling-member-integrated motor for generating a high-speed rotational force with received electric power.

2. Background

In general, a motor includes a stator around which a coil having magnetism is wound and a rotor, the rotor is rotated by means of a magnetic flux generated by a current applied to the coil wound around the stator and electromagnetic induction of the rotor so that a rotational shaft is rotated to utilize a power of the rotational shaft.

As high temperature heat is generated from the stator and the rotor during an operation of the motor, a cooling means is required for cooling the motor.

Methods for cooling the motor are divided into air-cooling methods utilizing a cooling fan and water-cooling methods utilizing cooling water.

As one air-cooling method, there is a method in which a cooling member is inserted between an inner circumferential surface of one housing and an outer circumferential surface of the other housing to assemble the housings and the cooling member. As another air-cooling method, there is a method in which the cooling member is inserted along an outer circumferential surface of the stator to assemble the cooling member and stator.

As compared with the method in which the cooling member is inserted and assembled, however, the dual housing structure is disadvantageous in that a shock is caused by a vibration or stability is deteriorated. Also, the method in which the cooling member is inserted and assembled is disadvantageous in that a process for inserting the cooling member along an outer circumferential surface of the stator requires extreme accuracy and takes a long time.

In addition, a process for molding the stator must be performed to secure durability of the stator, and an additional molding process is required for securing a durability of the stator.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
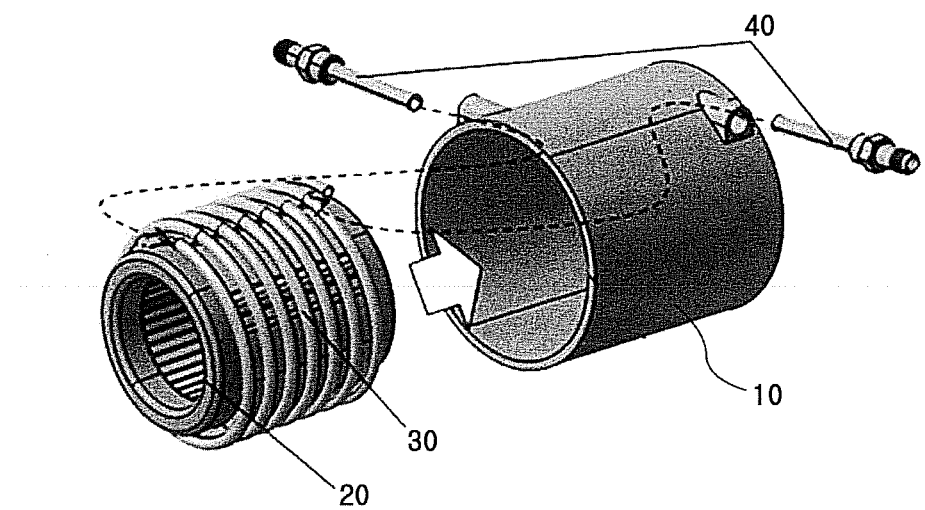
FIG. 1 is an exploded perspective view of a cooling-member-integrated motor according to one embodiment of the present application.

Terms including the ordinal numeral such as "first," "second," etc. may be used to describe various components, but the components are not limited by such terms. The terms are used only for the purpose of distinguishing one component from other components. For example, a first component may be designated as a second component without departing from the scope of the present application. In the same manner, the second component may be designated as the first component. The term "and/or" encompasses both combinations of the plurality of related items disclosed and any item from among the plurality of related items disclosed.

When an arbitrary component is described as being "connected to" or "linked to" another component, although this may refer to a case in which the arbitrary component is directly connected or linked to the second component, it may also refer to a case in which there is still another component or components therebetween. In contrast, when an arbitrary component is described as being "directly connected to" or "directly linked to" another component, this should be understood to mean that there are no other components therebetween.

The terms used in the specification of the present application are used only to illustrate specific embodiments, and are not intended to limit the present application. A singular expression can include a plural expression as long as the context does not indicate otherwise. In the present specification, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present application pertains. The terms defined in a generally used dictionary must be understood to have meanings identical to those used in the context of the related art, and are not to be construed to have ideal or excessively formal meanings unless explicitly specified in the present specification.

Hereinafter, the embodiment of the present application will be described in detail with reference to the accompanying drawings. Structural elements which are the same as or correspond to structural elements that have already been illustrated will be indicated by the same reference numeral, and illustration thereof omitted.

Figure 2:
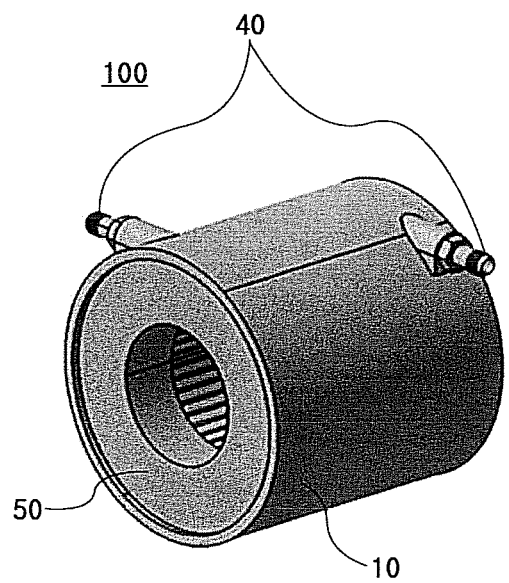
FIG. 2 is a perspective view of a cooling-member-integrated motor according to one embodiment of the present application.
Figure 3:
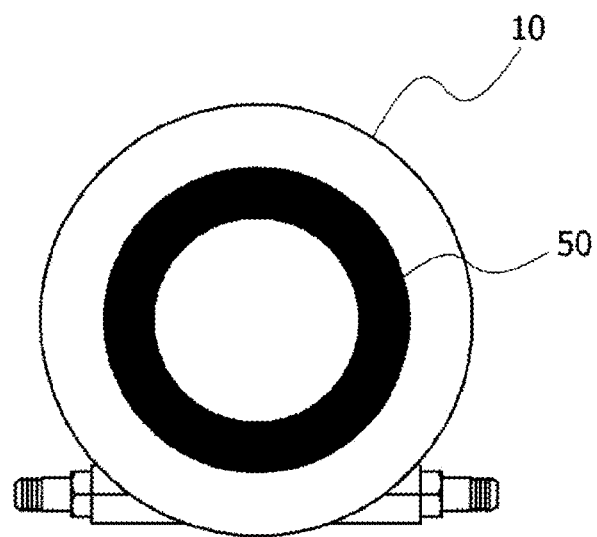
FIG. 3 is a cross-sectional view of a cooling-member-integrated motor according to one embodiment of the present application.

FIG. 1 is an exploded perspective view of a cooling-member-integrated motor according to one embodiment of the present application, FIG. 2 is a perspective view of a cooling-member-integrated motor according to one embodiment of the present application, and FIG. 3 is a cross-sectional view of a cooling-member-integrated motor according to one embodiment of the present application.

Referring to FIG. 1 and FIG. 2, a cooling-member-integrated motor 100 according to one embodiment of the present application may include a housing 10; a stator 20 including a stator core and a stator coil wound around the stator core; a cooling member 30 surrounding an outer circumferential surface of the stator 20; and a molding member 50 for integrally embedding the stator 20 and the cooling member 30 in the housing 10.

First, the housing 10 can be formed as a circular-sectioned tube having a receiving space formed therein, with both opened ends and a constant diameter in the lengthwise direction. Both opened ends of the housing 10 may be covered with a pair of brackets (not shown). By coupling the brackets to both ends, the housing 10 may have a cylindrical shape.

Alternatively, the housing 10 may have a polygonal section, and of course may have various shapes according to a shape of the stator 20.

The stator 20 may be accommodated in an inner receiving space of the housing 10 to generate magnetic force. The stator 20 is disposed along an inner circumferential surface of the housing 10 and may include a core and a coil wound around the core.

Both ends of the stator 20 are opened, and the stator may have a circular receiving space formed at a central portion thereof for rotatably receiving a rotor. A plurality of slots and teeth may be formed on an inner circumferential surface of the stator 20 and disposed in a circumferential direction of the space in which the rotor is received.

When a current is applied to the stator 20 to generate the magnetic force, the rotor (not shown) is rotated by electromagnetic induction of the rotor. At this time, heat is generated from the stator 20 and the rotor due to a high-output power density.

The cooling member 30 surrounds an outer circumferential surface of the stator 20 and is in direct contact with the stator 20 so that the cooling member can cool the stator from which the heat is generated. The cooling member may be formed by bending one tube several times and may provide a continuous flow passage of cooling water along an inner tube.

Figure 6:
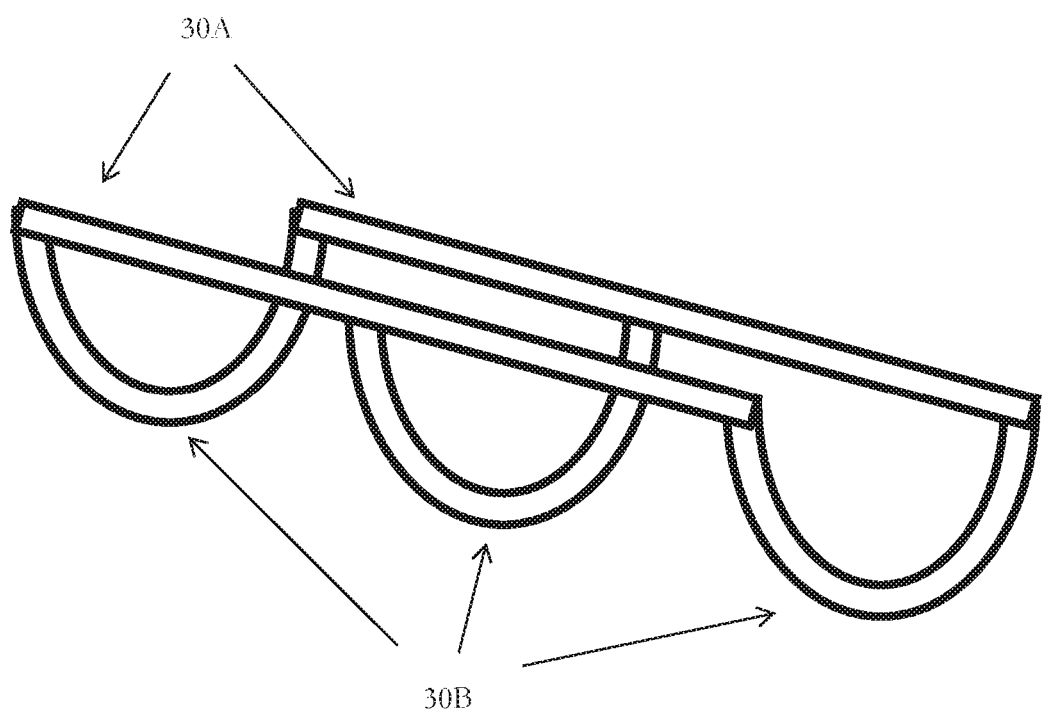
FIG. 6 is a view of a cooling-member according to one embodiment of the present application.

As depicted in FIG. 6, the cooling member 30 may include a plurality of first flow passages 30A extending in the circumferential direction of the housing 10 and a plurality of second flow passages 30B connecting the first flow passages 30A to each other.

The first flow passage 30A has a straight line shape and extends in the circumferential direction of the housing 10, and the second flow passage 30B is bent in the shape of a U and may connect the first flow passages 30A to each other.

One end and the other end of the cooling member 30 act as an inlet and an outlet for cooling water, respectively, and may be coupled to a nipple 40 via a through hole formed in the housing 10.

Locations at which the inlet and the outlet of the cooling member 30 are formed may be determined according to a length of the cooling member 30. In one embodiment of the present application, the inlet and the outlet are formed on opposite sides with respect to a central axis of the housing 10.

Alternatively, the inlet and the outlet may be formed in the same direction or may be adjacent to each other. This structure may be arbitrarily adjusted according to a location to which cooling water is supplied.

In the housing 10, the stator 20 and the cooling member 30 can be integrally embedded in a molding member 50.

The stator 20 and the cooling member 30 are embedded in the molding member 50 along an inner circumferential surface of the housing 10. The molding member 50 may have a hollow cylindrical shape, an outer circumferential surface of which is in contact with an inner circumferential surface of the housing 10. Also, a surface of the stator 20 may protrude toward an inside of the molding member through an opening of an inner circumferential surface of the molding member. As a result, a surface of the stator 20, which protrudes toward an inside of the molding member, can be coupled with the rotor.

In other words, the stator 20 and the cooling member 30 are integrally embedded in the molding member 50 and the molding member is then coupled with the housing 10 along an inner circumferential surface of the housing. Here, the coil part wound around the stator is exposed toward an inner circumferential surface of the housing 10 to enable the rotor to be coupled with the coil.

The molding member 50 may be formed of a material having high thermal conductivity. For example, at least one of graphite, silicon and a plastic resin may be employed as the material for the molding member.

In addition, the molding member 50 is formed of a material having high flowability to enable locations of the inlet and the outlet of the cooling member 30 to be easily changed.

Figure 4:
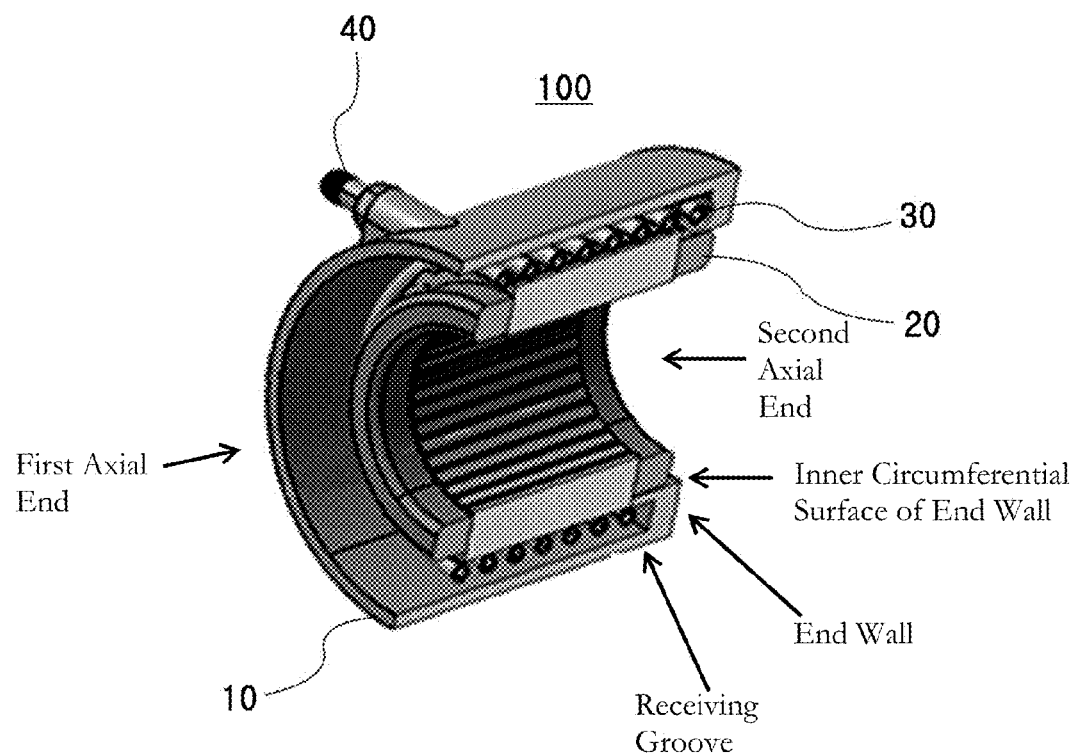
FIG. 4 and FIG. 5 are views illustrating a process for forming a cooling-member-integrated motor according to one embodiment of the present application.
Figure 5:
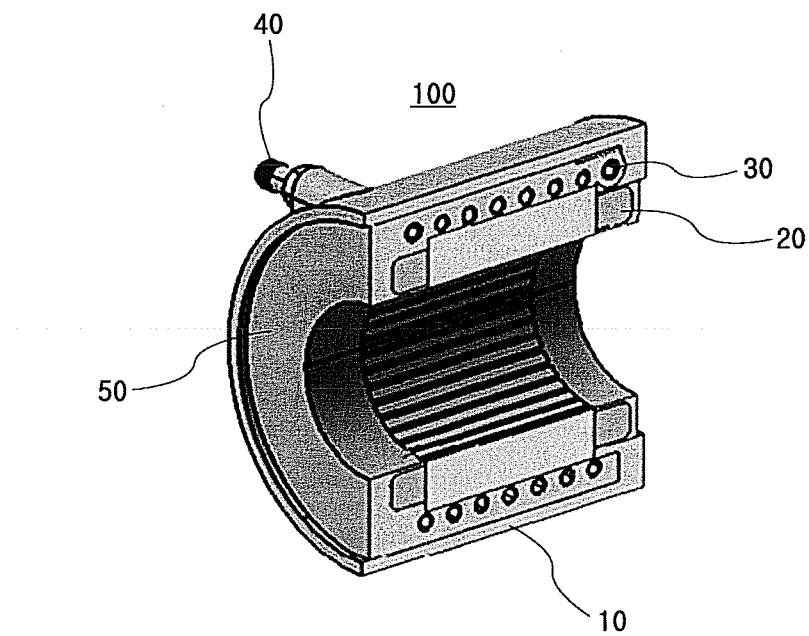

FIG. 4 and FIG. 5 are views illustrating a process for forming a cooling-member-integrated motor according to one embodiment of the present application.

Firstly, referring to FIG. 4, the stator 20 surrounded by the cooling member 30 is placed in the housing 10. In this state, since the cooling member 30, the stator 20 and the housing 10 are not completely coupled with each other, it is possible to arbitrarily adjust locations of the inlet and the outlet of the cooling member 30.

The molding member 50 is formed along an inner circumferential surface of the housing 10, and the stator 20 and the cooling member 30 placed in the housing 10 are integrally embedded in the molding member 50. At this time, the molding member 50 is formed in a hollow cylindrical shape, an outer circumferential surface of which is in direct contact with the housing 10. Also, a surface of the stator 20 protrudes outward along an outer circumferential surface of the molding member.

In the cooling-member-integrated motor according to the present application, a cooling effect can be enhanced by disposing the cooling member at a place adjacent to the stator, and the stator is integrally coupled with the cooling member so that the manufacturing process can be simplified.

The present application is directed to a cooling-member-integrated motor which can enhance a cooling effect through a cooling member disposed adjacent to a stator and can simplify a manufacturing process due to a cooling member coupled integrally with a stator.

According to an aspect of the present application, there is provided a cooling-member-integrated motor comprising a housing; a stator including a stator core and a stator coil wound around the stator core; a cooling member surrounding an outer circumferential surface of the stator; and a molding member disposed in the housing, the molding member being formed such that the stator and the cooling member are integrally embedded in the molding member.

The stator and the cooling member may be embedded in the molding member along an inner circumferential surface of the housing.

The molding member may be formed of at least one of graphite, silicon and a plastic resin.

The cooling member may be formed by bending a straight line shaped pipe several times and may surround an outer circumferential surface of the stator.

The cooling member may comprise a plurality of first flow passages, each of which extends in a circumferential direction of the stator, and a second flow passage connecting the first flow passages.

Locations of a cooling fluid inlet and a cooling fluid outlet of the cooling member may be adjusted according to a length of the pipe.

The molding member may have a hollow cylindrical shape and an outer circumferential surface of the molding member may be in contact with an inner surface of the housing.

The molding member may have a hollow cylindrical shape and a surface of the stator may protrude to an outside along an inner outer circumferential surface of the molding member.

In an embodiment shown in FIGS. 4 and 5, a cooling-member-integrated motor includes a housing having a first axial end with an opening, a second axial end, and an end wall that extends radially inward at the second axial end to define a receiving groove; a stator including a stator core and a stator coil wound around the stator core; and a cooling member disposed between an inner circumferential surface of the housing and an outer circumferential surface of the stator. The stator and the cooling member are inserted into the housing through the opening in the first axial end of the housing, an interior circumferential surface of the end wall contacts an axial end of the stator, and an axial end of the cooling member is positioned in the receiving groove at the second axial end. The cooling-member-integrated motor further includes a hollow cylindrical shaped molding member disposed in the housing through the opening in the first axial end of the housing. The molding member is disposed along a surface of the stator, and the molding member has a hollow cylindrical shape so that an outer circumferential surface of the molding member is in contact with the inner circumferential surface of the housing. The cooling member is integrally embedded in the molding member between the housing and the stator, and an interior circumferential surface of the stator is exposed through an opening of the molding member. The cooling member includes a plurality of second flow passages extending in a circumferential direction of the housing and a plurality of first flow passages connecting the second flow passages. The axial end of the cooling member does not contact the stator directly, and other parts of the cooling member directly contact the stator when the cooling member is positioned in the receiving groove at the second axial end of the housing.

Any reference in this specification to "one embodiment," "an embodiment," "example embodiment," etc., means that a particular feature, structure, or characteristic described in connection with the embodiment is included in at least one embodiment of the application. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cooling-member-integrated motor, comprising;
a housing having a first axial end with an opening, a second axial end, and an end wall that extends radially inward at the second axial end to define a receiving groove;
a stator including a stator core and a stator coil wound around the stator core;
a cooling member disposed between an inner circumferential surface of the housing and an outer circumferential surface of the stator, wherein the stator and the cooling member are inserted into the housing through the opening in the first axial end of the housing, an interior circumferential surface of the end wall contacts an axial end of the stator, and an axial end of the cooling member is positioned in the receiving groove at the second axial end; and
a hollow cylindrical shaped molding member disposed in the housing through the opening in the first axial end of the housing,
wherein the molding member is disposed along a surface of the stator,
wherein the molding member has a hollow cylindrical shape so that an outer circumferential surface of the molding member is in contact with the inner circumferential surface of the housing,
wherein the cooling member is integrally embedded in the molding member between the housing and the stator,
wherein an interior circumferential surface of the stator is exposed through an opening of the molding member,
wherein the cooling member comprises a plurality of second flow passages extending in a circumferential direction of the housing and a plurality of first flow passages connecting the second flow passages, and
wherein the axial end of the cooling member does not contact the stator directly, and other parts of the cooling member directly contact the stator when the cooling member is positioned in the receiving groove at the second axial end of the housing.

2. The cooling-member-integrated motor of claim 1, wherein the stator and the cooling member are embedded in the molding member along an inner circumferential surface of the housing.

3. The cooling-member-integrated motor of claim 1, wherein the molding member is formed of at least one of graphite, silicon and a plastic resin.

4. The cooling-member-integrated motor of claim 1, wherein locations of a cooling fluid inlet and a cooling fluid outlet of the cooling member are adjusted according to a length of a pipe forming the cooling member.

5. The cooling-member-integrated motor of claim 1, wherein ends of the cooling member, acting as an inlet and an outlet for cooling water, are coupled to nipples respectively via through holes formed in the housing.

6. The cooling-member-integrated motor of claim 5, wherein the inlet and the outlet of the cooling member are formed, respectively, on opposite sides relative to a central axis of the housing.

* * * * *